July 29, 1958  H. W. BROWN  2,845,499
ELECTRIC SWITCHES AND PARTS THEREFOR
Filed Oct. 22, 1954  3 Sheets-Sheet 1

Inventor
Harry W. Brown.
By Grover C. Frater
Attorney

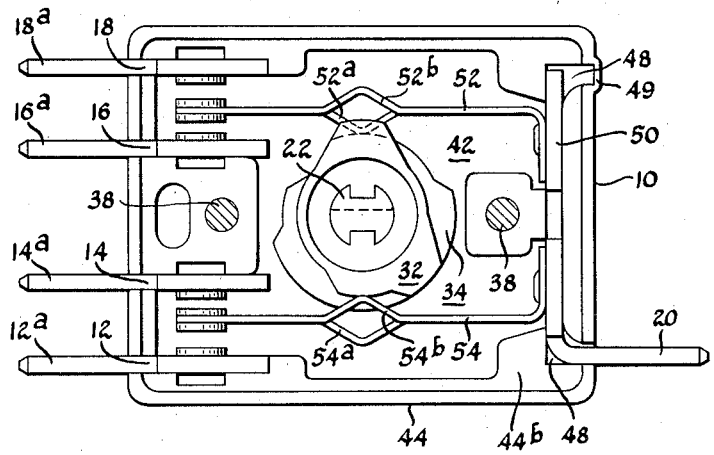
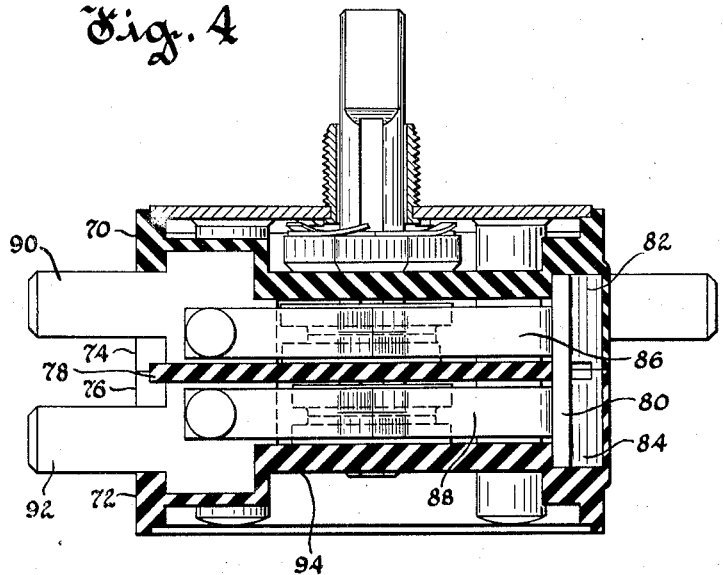

July 29, 1958 H. W. BROWN 2,845,499
ELECTRIC SWITCHES AND PARTS THEREFOR
Filed Oct. 22, 1954 3 Sheets-Sheet 3
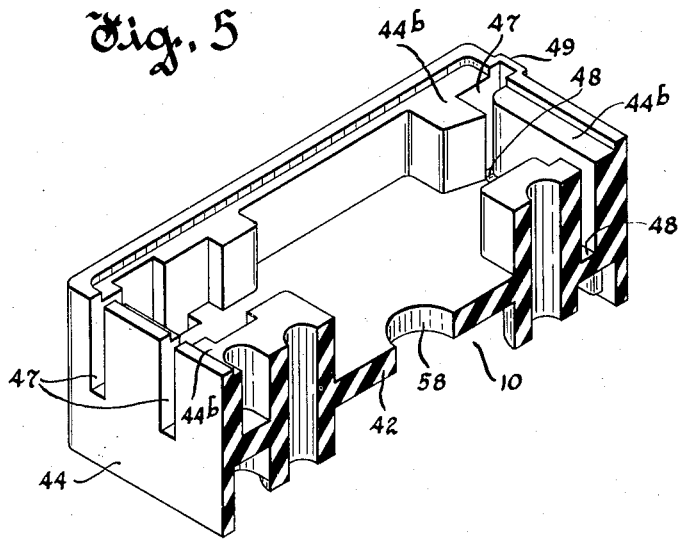
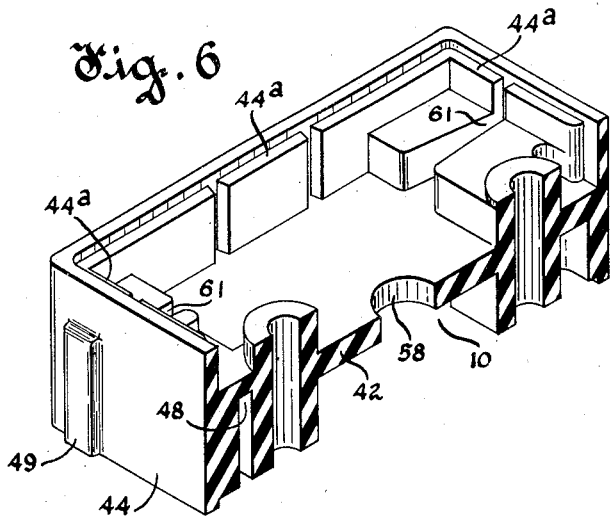
Inventor
Harry W. Brown
By Grover C. Frater
Attorney

United States Patent Office

2,845,499
Patented July 29, 1958

2,845,499

ELECTRIC SWITCHES AND PARTS THEREFOR

Harry W. Brown, West Allis, Wis., assignor to Cutler-Hammer, Inc., Milwaukee, Wis., a corporation of Delaware Application October 22, 1954, Serial No. 463,859

13 Claims. (Cl. 200—6)

This invention relates to improvements in electric switches and parts therefor.

An object of the invention is to provide improved electric switches which may be assembled easily and inexpensively to provide any one of many combinations of circuit arrangements with a minimum number of tools and a few interchangeable parts.

Another object is to provide universal switch parts which are especially adapted to be used without modification in making any of many possible switches.

Certain of these objects are realized by the provision of switch parts which interlock with one another so that a minimum of fastening members is required. A special base and operating shaft are employed and the remaining parts interlock with these rather than with one another. Thus parts may be added, omitted or substituted at will and a kit of switch parts may be assembled, by hand if preferred, to form switches having any one of millions of possible circuit combinations.

The advantages of such a switch and such parts in respect to maintaining stocks of switch parts and in supplying modified switches for various applications and the like are readily apparent and another object of the invention is to provide a switch in which these advantages can be realized.

Certain other advantages and objects of the invention will hereinafter appear.

Certain embodiments of the invention are illustrated in the accompanying drawings which will now be described, it being understood that certain modifications are possible in the embodiments illustrated and that other embodiments are possible without departing from the spirit of the invention or the scope of the appended claims.

In the drawings,

Fig. 3 is a view taken on line 3—3 of Fig. 1;

Fig. 4 is a partly cross-sectional and partly elevational view of a switch of alternative form embodying the invention; and Figs. 5 and 6 are isometric, sectional views of the bottom and top, respectively, of a switch base.

Figure 1:
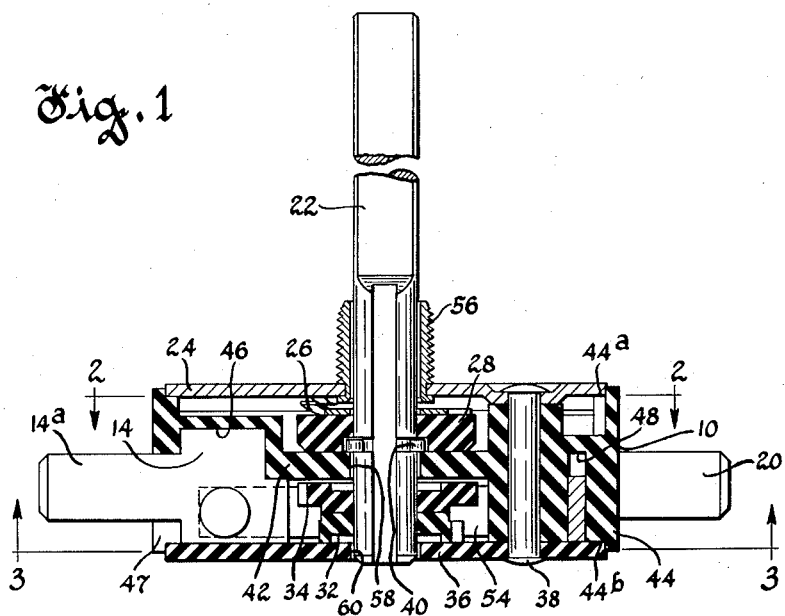
Fig. 1 is a partly cross-sectional and partly elevational view of a switch embodying the invention.
Figure 2:
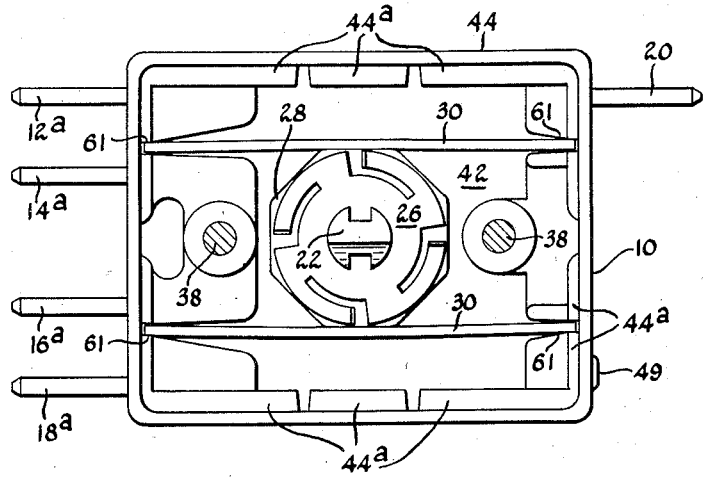
Fig. 2 is a view taken on line 2—2 of Fig. 1.

The switch illustrated in Figs. 1, 2 and 3, comprises a base 10, fixed contact structures or members 12, 14, 16 and 18, movable contact set 20, operating shaft 22, cover member 24, a ratchet 26, indexing cam 28, indexing cam springs 30, operating cams 32 and 34, a bottom separator 36 and rivets 38. A small split washer or retaining ring 40 prevents end-wise movement of shaft 22.

Except for certain rivets in the movable contact set 20, all of these switch parts fit in conformations and depressions in the base 10 or are otherwise interlockingly arranged so that rivets 38 hold the switch together.

The base 10 is formed or fabricated from insulating material. It consists of an intermediate dividing wall 42 bounded by an outer wall 44 which extends perpendicularly above and below the dividing wall 42. The dividing wall separates the base so that it has two large cavities opening at the top and bottom ends of the base, respectively. The wall 44 is further recessed at both the top and bottom ends of the base to form shoulders 44a and 44b, respectively. Within these latter recesses, the cover 24 and separator 36 are accommodated. The depth of the recesses is nearly one-half of the thickness of the flat separator 36.

As best illustrated in Figs. 1 and 2, the dividing wall 42 is raised at its right and left sides and depressions 46 and 48 are formed in the raised portions from below. In proximity to these depressions, the wall 44 is provided with transverse slots 47 opening at the bottom end of the wall and initially covered, by "knock-out" sections such as section 49. Fixed contact members 12, 14, 16 and 18 are shaped to fit into and to be held in place against movement in two directions in an associated depression 46 with their terminal portions 12a, 14a, 16a and 18a respectively extending through said slots after appropriate ones of the "knock-out" sections 49 are ground or broken away.

The movable contact structure 20 comprises a terminal bar 50 which rests in depression 48 and has a terminal portion extending through a slot in wall 44. A pair of contact carrying springs 52 and 54, which are riveted to bar 50, extend across the lower cavity of base 10 and between associated pairs of fixed contact members. Each of springs 52 and 54 is slit longitudinally at a point midway along its length and the upper portions 52a and 54a and lower portions 52b and 54b are bent oppositely out of the plane of the spring to form a cam follower. Contact tips at the outer extremities of springs 52 and 54 cooperate with contact tips on the stationary contact members.

Cover 24 may be provided with an externally threaded mounting bushing 56 as shown. The axial opening in this bushing aligns with an opening 58 in the divider wall or web 42 of base 10 and another opening 60 in the separator member 36. The operating shaft 22 is journaled in these openings.

Operating cams 32 and 34 are mounted on shaft 22 and are disposed in the lower cavity of the base 10. Their cam surfaces cooperate with the cam follower portions of springs 54 and 52, respectively to accomplish switching action as shaft 22 is rotated. These cams, and the indexing cam 28, are provided with keys which fit in longitudinal keyways formed in shaft 22.

The indexing cam 28 is disposed in the upper cavity of the base 10. A recess in the bottom face of the cam accommodates the split washer 40 which is fitted in a peripheral groove in shaft 22. Washer 40 serves to limit axial movement of the shaft 22. Being polygonally shaped, the cam 28 cooperates with indexing springs 30, 30 to index rotation of shaft 22. The springs 30, 30 are held in notches 61 formed in base 10.

A space is provided between cam 28 and cover 24 for mechanism to determine the degree of rotation and the direction of rotation of shaft 22. A plain washer is used when the degree and direction of shaft rotation is to be unlimited. Specially shaped washers such as ratchet spring 26 are used to limit rotational degree or direction.

A minimum of fastening means are required to assemble the switch. The cover 24 holds in place the shaft 22, cam 28 and washer 40, ratchet spring 26 and springs 30, 30. The separator 36 holds in place the contact members 12, 14, 16, 18 and 20, and cams 32 and 34. The parts need only be placed in their respective positions and conformations of base 10. Securing the cover 24 and separator 36 to the base locks all of the switch parts in their respective working positions.

Thousands of variations in switching sequences and circuit arrangements are possible to be provided with these few simple parts and a few standard tools merely by adding or omitting contactor members and changing or re-orienting cams. Literally millions of circuit combinations are possible when two units are combined as illustrated in Fig. 4.

When two units are to be combined for operation from a single operating shaft, a second switch base is added to the bottom end of a unit such as that shown in Figs. 1 through 3. The separator member 36 extends a distance substantially equal to one-half its thickness without base 10. This portion of member 36 fits within the recess in the wall of the added base so that the walls of the bases are in juxtaposition. Appropriate operating cams and the contact members are inserted into the added base and a longer operating shaft is employed.

In the multiple section unit illustrated in Fig. 4, the sections are electrically interconnected. Two bases 70 and 72, each similar to base 10, are employed in end-to-end relationship with the ends of their side walls 74 and 76 in abutting relationship. A separator 78, like separator 36 of Fig. 1 except shorter, rests partially in the recess in the wall of each of said bases. The movable contact structure comprises a double width terminal bar 80 which is fitted within like recesses 82 and 84 of bases 70 and 72 respectively and has a terminal portion extending from one of said bases. Contact springs 86 and 88 are secured to the contact bar 80 and extend on opposite sides of separator 78 into association with fixed contact members 90 and 92.

The lower base in this switch is like the upper base but is turned end for end. The lower cavity of the lower base is not used so this cavity may be left open. The dividing wall 94 serves as a cover for the bottom end of the switch.

I claim:

1. In an electrical switch, in combination, a unitary insulating base comprising a peripheral wall and a generally flat portion forming an open-ended cavity, a cover plate for closing said cavity, a group of openings at one region of said wall for accommodating fixed contact strip members, fixed contact strip members extending through said openings each having a contact portion within said cavity, at least one other opening at another region of said wall for accommodating a movable contact terminal member, a movable contact terminal member extending through said opening, at least one movable contact element extending from said terminal member along said cavity and having a free end contacting portion in cooperative relation with the contact portions of said fixed contact strip members, grooves in said flat portion adjacent said openings interiorly of said cavity for retaining said members in predetermined positions in cooperation with said cover plate, and operator means for selectively effecting engagement between said free end contacting portion and said fixed contact portions.

2. In a multi-position switch, in combination, a unitary insulating base comprising a peripheral wall and a generally flat portion forming an open-ended cavity, a cover plate for closing said cavity, a group of openings at one region of said wall for accommodating fixed contact strip members, at least one other opening at another region of said wall for accommodating a movable contact terminal member, and grooves in said flat portion adjacent said openings interiorly of said cavity for retaining said members in predetermined positions in cooperation with said cover plate, said openings in said peripheral wall being partially formed openings having integrally formed and readily removable outer cover beads closing the same for accommodating said members when selected cover beads are removed.

3. In a multi-position switch, in combination, a unitary insulating base comprising a peripheral wall and a generally flat portion forming an open-ended cavity, a cover plate for closing said cavity, a group of openings at one region of said wall for accommodating fixed contact strip members, at least one other opening at another region of said wall for accommodating a movable contact terminal member, fixed contact strip members extending through selected ones of said group of openings into said cavity, at least one movable spring arm extending along said cavity having a free end in cooperative relation to said fixed contact strip members and a fixed end, a terminal member extending through a selected other opening electrically connected to said fixed end, and means extending through said cover plate and said flat portion for operating said movable spring arm.

4. The combination according to claim 1 wherein the last mentioned means comprises an operating shaft and rotary cam means secured thereto and said spring arm comprises integral cam follower means at a mid-portion thereof for cooperation with said cam means.

5. The combination according to claim 4 together with means secured to said shaft on the opposite side of said bottom portion from said cavity defining a plurality of operating positions for said shaft, the last mentioned means being biased to operate said shaft to the nearest operating position when said shaft is released and to insure a positive stop at each operating position.

6. The combination according to claim 5 together with means comprising ratchet means secured to said shaft for limiting movement of the latter to one direction.

7. The combination according to claim 6 wherein said shaft comprises at least two slots running parallel to its axis on opposite sides thereof for receiving complementary lugs formed integrally with said cam means to prevent relative rotation therebetween.

8. In a multi-position switch, in combination, a unitary insulating base comprising a peripheral wall and a generally flat portion forming an open-ended cavity, a cover plate for closing said cavity, a group of openings at one region of said wall for accommodating fixed contact strip members, at least one other opening at another region of said wall for accommodating a movable contact terminal member, fixed contact strip members extending through selected ones of said group of openings into said cavity, a pair of movable spring arms extending along said cavity having free ends in cooperative relation with a plurality of said fixed contact strip members and fixed ends, a terminal member extending through a selected other opening in said wall electrically connected to said fixed ends, and a cam-carrying operating shaft journaled in said cover plate and said flat portion for operating said movable spring arms.

9. The combination according to claim 8, wherein each fixed contact strip member has a contact tip on one side thereof in cooperative relation with the contact tips of the spring arms, and said base comprises small cavities adjacent the other sides of said fixed contact strip members to provide for use of interchangeable double-tip fixed contact strip members of like configuration.

10. In a multi-position electrical switch, in combination, a plurality of stackable switch units, each switch unit comprising a substantially rectangular insulating base in which upper and lower open-ended cavities are defined by peripheral walls extending perpendicularly in opposite directions from a generally flat dividing portion separating said cavities, a group of openings in said wall at one end of said base leading into one of said cavities for accommodating fixed contact strip members, at least one opening in said wall at another end of said base leading into said one cavity for accommodating a movable-contact terminal member, grooves in said flat portion adjacent corresponding openings interiorly of said one cavity for retaining the members in predetermined positions in said base, each open end of said base having opposite engaging portions for receiving a divider plate, and a common divider plate between abutting switch units and having opposite engaging portions on both sides thereof for tight-fitting engagement with the complementary engaging portions of the abutting switch units, the opposite engaging portions of said divider plate on the one hand and the opposite complementary engaging portions of said switch units on the other hand being alike and symmetrical to provide stacking of said switch units in top to bottom, top to top and bottom to bottom relations and in all of the aforesaid relations with one unit rotated 180 degrees relative to its abutting unit.

11. In a multi-position electrical switch, in combination, a plurality of stacked switch units, each switch unit comprising a unitary insulating base in which two cavities are defined by peripheral walls extending perpendicularly in opposite directions from a generally flat dividing portion separating said cavities, a plurality of fixed contact strip members extending from one of said cavities through the peripheral wall at one side of said base and having laterally extending portions, movable contact means comprising spring arms having face ends in cooperative relation to said fixed contact strip members and a common terminal portion extending through the peripheral wall at another side of said base, molded grooves on said dividing portion opening into said one cavity for removably receiving said laterally-extending portions of said fixed contact strip members and said common portion of said movable contact means and positioning the same in said base, a common divider plate having engaging portions on opposite sides thereof for tight-fitting engagement with complementary engaging portions on abutting switch units, and a multi-position operating shaft extending through said stacked switch units having cam means in said one cavity of each unit for selectively operating said spring arms and positioning means in the other cavity of at least one of said units defining a plurality of operating positions for said shaft.

12. In a multi-position electrical switch, in combination, a plurality of stacked switch units, each switch unit comprising a unitary insulating base comprised of a substantially rectangular molding in which upper and lower cavities are defined by peripheral walls extending perpendicularly in opposite directions from a generally flat dividing portion separating said cavities, said dividing portion having a plurality of spaced depressions adjacent one end and an elongated depression adjacent the opposite end opening into one of said cavities, a plurality of fixed contact strip members extending from said one cavity through the peripheral wall at said one end of said base, each of said contact strips having a lateral projection formed to fit the respective depressions at said one end for fixing the contact strips in said base, a terminal member disposed along the opposite peripheral end wall of said base at least partly in said elongated depression for fixing said terminal member in said base and having a perpendicular end portion extending through said peripheral end wall at said opposite end of said base, a pair of like spring arms electrically connected to and extending from said terminal member along said one cavity to points adjacent to said fixed contact strip members for cooperation with the latter, a pair of electrically insulated cams in abutting axial alignment on an axis perpendicularly through the center of said dividing portion between said spring arms, each spring arm being biased toward said cams and provided at its intermediate portion with a cam follower for cooperation with a respective cam, a common divider plate having engaging portions cooperating with complementary engaging portions on adjacent stacked switch units, an operating shaft extending through said switch units for rotating the pairs of cams, and spring-biased positioning means having a plurality of operating positions corresponding to selective positions of said contact arms secured to said shaft in the other cavity of at least one of said switch units.

13. In a multi-position electrical switch, in combination, a unitary insulating base comprising a substantially rectangular molding in which upper and lower cavities are defined by peripheral walls extending perpendicularly in opposite directions from a substantially flat dividing portion separating said cavities, said dividing portion having a plurality of spaced depressions at one end and an elongated depression at the opposite end opening into said lower cavity, the inner wall of said elongated depression having cut-out portions intermediate its ends opening into said lower cavity, a plurality of fixed contact strip members disposed in said lower cavity adjacent to the peripheral wall at said one end and standing parallel to the peripheral wall at the sides of said base, each of said contact strips having an integral projection slidably accommodated in the respective depression at said one end for positioning the contact strips in said base, a terminal member disposed on edge along said opposite peripheral end wall of said base in said elongated depression and having a portion extending perpendicularly therefrom through and without said peripheral end wall at said opposite end, a pair of like spring arms electrically connected to and extending through the gaps left by said cut-out portions and across said lower cavity to points adjacent to said fixed contact strip members, a pair of electrically insulated cams stacked one above the other on an axis perpendicular to a central point of the dividing portion of said base, said spring arms being disposed on opposite sides of said cams and being biased theretoward and each being provided with an integral cam follower intermediate its ends for cooperation with a respective one and only one of said cams, an insulating plate closing said lower cavity for retaining said fixed contact strip members and said terminal member in their respective depressions, an operating shaft rigidly secured to said cams for rotating the latter to operate said spring arms, and spring-biased positioning means rigidly secured to said shaft in said upper cavity having a plurality of operating positions corresponding to selective positions of said spring arms.

References Cited in the file of this patent

UNITED STATES PATENTS

| | | |
|---|---|---|
| 2,120,424 | Forstrom | June 14, 1938 |
| 2,182,715 | Yeske | Dec. 5, 1939 |
| 2,243,566 | Kimball | Dec. 27, 1941 |
| 2,361,017 | Flick et al. | Oct. 24, 1944 |
| 2,361,058 | Rickmeyer | Oct. 24, 1944 |
| 2,418,329 | Bazley | Apr. 1, 1947 |
| 2,506,653 | Soreng et al. | May 9, 1950 |
| 2,626,334 | Koenig | Jan. 20, 1953 |
| 2,644,144 | Richardson | June 30, 1953 |

FOREIGN PATENTS

| | | |
|---|---|---|
| 183,548 | Switzerland | Apr. 15, 1936 |